United States Patent
Isada et al.

(10) Patent No.: US 9,976,470 B2
(45) Date of Patent: May 22, 2018

(54) AFTERTREATMENT MODULE HAVING REPLACEABLE CATALYST HOUSING

(71) Applicant: Caterpillar Inc., Peoria, IL (US)

(72) Inventors: Raymond U. Isada, Peoria, IL (US); Kurtis E. Chenoweth, Ipava, IL (US); Eric Spaeth, Pekin, IL (US); Ping Xiang, Edwards, IL (US); Yung T. Bui, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days. days.

(21) Appl. No.: 15/494,919

(22) Filed: Apr. 24, 2017

(65) Prior Publication Data

US 2017/0241322 A1    Aug. 24, 2017

Related U.S. Application Data (62) Division of application No. 14/562,067, filed on Dec. 5, 2014, now Pat. No. 9,677,447.

(51) Int. Cl.
| | |
|---|---|
| *F01N 3/18* | (2006.01) |
| *F01N 13/18* | (2010.01) |
| *F01N 13/00* | (2010.01) |
| *F01N 3/20* | (2006.01) |

(52) U.S. Cl.
CPC ....... *F01N 13/1855* (2013.01); *F01N 3/2066* (2013.01); *F01N 13/002* (2013.01); *F01N 13/1827* (2013.01); *F01N 2610/02* (2013.01)

(58) Field of Classification Search
CPC .... F01N 3/2842; F01N 3/2892; F01N 13/017; F01N 2450/30
See application file for complete search history.

(56) References Cited

U.S. PATENT DOCUMENTS

| | | | |
|---|---|---|---|
| 3,247,665 A | | 4/1966 | Behrens |
| 4,709,549 A | * | 12/1987 | Lepperhoff ........... F01N 3/0211 422/179 |
| 8,393,147 B2 | | 3/2013 | Gerges |
| 8,596,049 B2 | | 12/2013 | Isada et al. |
| 8,747,788 B1 | | 6/2014 | Baig et al. |
| 2003/0039595 A1 | | 2/2003 | Geise |
| 2005/0284139 A1 | | 12/2005 | Verkiel |
| 2008/0196370 A1 | | 8/2008 | Schramm |

(Continued)

FOREIGN PATENT DOCUMENTS

| | | |
|---|---|---|
| CN | 2014166076 | 10/2014 |
| WO | 2012134519 | 10/2012 |
| WO | 2014003718 | 1/2014 |

*Primary Examiner* — Jonathan Matthias
(74) *Attorney, Agent, or Firm* — Finnegan, Henderson, Farabow, Garrett & Dunner, LLP (57) ABSTRACT

An aftertreatment module is disclosed for use with an engine. The aftertreatment module may have an inlet housing at least partially defining an inlet passage for exhaust, and at least one mixer disposed in the inlet passage. The aftertreatment module may also have an outlet housing at least partially defining an outlet passage for exhaust, and a catalyst housing removably connected between the inlet housing and the outlet housing. The aftertreatment module may further have a plurality of catalyst substrates configured to be mounted in the catalyst housing, to receive exhaust from the inlet passage in parallel, and to discharge exhaust to the outlet housing in parallel.

8 Claims, 5 Drawing Sheets

(56) References Cited

U.S. PATENT DOCUMENTS

| | | |
|---|---|---|
| 2009/0293452 A1 | 12/2009 | Tarabulski |
| 2010/0281851 A1 | 11/2010 | Roach |
| 2012/0102928 A1 | 5/2012 | Hehle et al. |
| 2014/0154139 A1 | 6/2014 | Van Niekerk et al. |
| 2014/0154159 A1 | 6/2014 | Rao et al. |
| 2016/0047285 A1 | 2/2016 | Alcini |

* cited by examiner

FIG. 5

AFTERTREATMENT MODULE HAVING REPLACEABLE CATALYST HOUSING

RELATED APPLICATIONS

The present disclosure claims the right to priority based on, and is a divisional of, U.S. patent application Ser. No. 14/562,067 filed Dec. 5, 2014, which is fully incorporated herein.

TECHNICAL FIELD

The present disclosure is directed to an aftertreatment module and, more particularly, to an aftertreatment module having a replaceable catalyst housing.

BACKGROUND

Internal combustion engines, including diesel engines, gasoline engines, gaseous fuel-powered engines, and other engines known in the art exhaust a complex mixture of air pollutants. These air pollutants are composed of gaseous compounds including, among other things, the oxides of nitrogen ($NO_x$). Due to increased awareness of the environment, exhaust emission standards have become more stringent, and the amount of $NO_x$ emitted to the atmosphere by an engine may be regulated depending on the type of engine, size of engine, and/or class of engine.

In order to comply with the regulation of $NO_x$, some engine manufacturers have implemented a strategy called selective catalytic reduction (SCR). SCR is an exhaust treatment process where a reductant, most commonly urea ($(NH_2)_2CO$) or a water/urea solution, is selectively injected into the exhaust gas stream of an engine and adsorbed onto a downstream substrate. The injected urea solution decomposes into ammonia ($NH_3$), which reacts with $NO_x$ in the exhaust gas to form water ($H_2O$) and diatomic nitrogen ($N_2$).

In some applications, the substrate used for SCR purposes may need to be very large to help ensure it has enough surface area or effective volume to adsorb appropriate amounts of the ammonia required for sufficient reduction of $NO_x$. These large substrates can be expensive and require significant amounts of space within the engine's exhaust system. In addition, the substrate must be placed far enough downstream of the injection location for the urea solution to have time to decompose into the ammonia gas and to evenly distribute within the exhaust flow for the efficient reduction of $NO_x$. This spacing may further increase packaging difficulties of the exhaust system.

Exhaust backpressure caused by the use of the SCR substrate described above can be problematic in some situations. In particular, the SCR substrate can restrict exhaust flow to some extent and thereby cause an increase in the pressure of exhaust exiting an engine. If this exhaust back pressure is too high, the breathing ability and subsequent performance of the engine could be negatively impacted. Accordingly, measures should be taken to avoid overly restricting exhaust flow when implementing SCR.

An exemplary aftertreatment module is disclosed in U.S. Pat. No. 8,747,788 of Baig et al. that issued on Jun. 10, 2014 ("the '788 patent"). In particular, the '788 patent discloses an aftertreatment module having a housing with an inlet and an outlet, and a catalyst bank separating the inlet from the outlet. The catalyst bank has a face disposed at an oblique angle relative to a flow direction through the inlet and the outlet. Passages having decreasing cross-sectional areas extend from the inlet to the catalyst bank, and from the catalyst bank to the outlet.

Although the aftertreatment module of the '788 patent may be functional in many applications, it may still be less than optimal. In particular, the catalyst bank may wear out after a period of time, and the catalyst bank may not be easily serviceable.

The aftertreatment module of the present disclosure addresses one or more of the needs set forth above and/or other problems of the prior art.

SUMMARY

In one aspect, the present disclosure is directed to an aftertreatment module. The aftertreatment module may include an inlet housing at least partially defining an inlet passage for exhaust, and at least one mixer disposed in the inlet passage. The aftertreatment module may also include an outlet housing at least partially defining an outlet passage for exhaust, and a catalyst housing removably connected between the inlet housing and the outlet housing. The aftertreatment module may further include a plurality of catalyst substrates configured to be mounted in the catalyst housing, to receive exhaust from the inlet passage in parallel, and to discharge exhaust to the outlet housing in parallel.

In another aspect, the present disclosure is directed to another aftertreatment module. This aftertreatment module may include an inlet housing at least partially defining an inlet passage having a first axis, and a first mounting flange oriented at an oblique angle relative to the first axis. The aftertreatment module may also include an outlet housing at least partially defining an outlet passage having a second axis, and a second mounting flange oriented at an oblique angle relative to the second axis. The aftertreatment module may further include a catalyst housing removably connected between the first and second mounting flanges.

In yet another aspect, the present disclosure is directed to an aftertreatment module for a vehicle having a mounting platform configured to be generally parallel with a ground surface supporting the vehicle. The aftertreatment module may include an inlet housing, an outlet housing, and a catalyst housing removably connected between the inlet housing and the outlet housing. The aftertreatment module may further include a mounting bracket having a bottom support configured to connect a bottom of the outlet housing to the mounting platform, and a side support protruding from the bottom support at an oblique angle and configured to engage a side of the outlet housing and a side of the catalyst housing.

DETAILED DESCRIPTION

Figure 1:
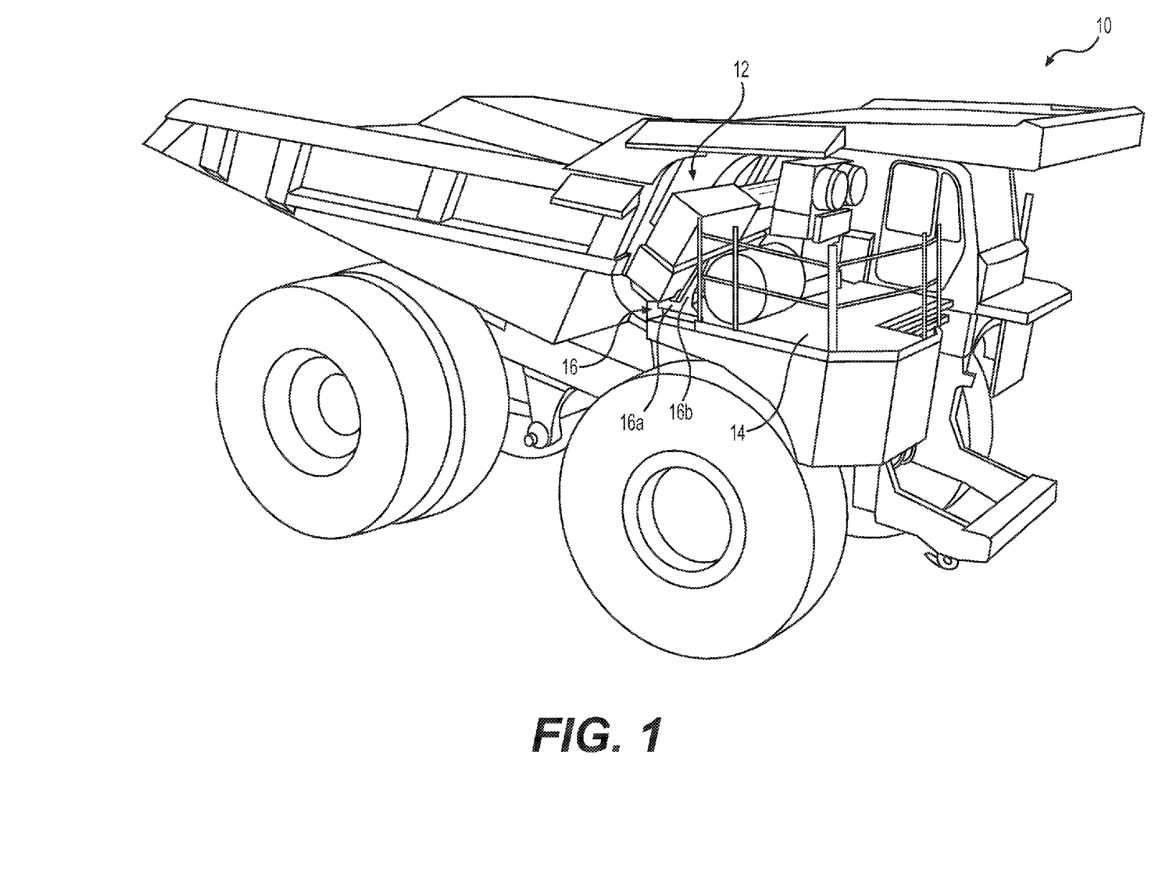
FIG. 1 is a pictorial illustration of an exemplary disclosed power system.

FIG. 1 illustrates an exemplary power system 10. For the purposes of this disclosure, power system 10 is depicted and described as a mobile machine, for example a haul truck, having one or more multi-cylinder internal combustion engines (not shown). Each engine may be configured to combust a mixture of air and fuel, for example diesel, gasoline, or a gaseous fuel, and to generate a mechanical output. The mechanical output from the engine(s) may be directed to propel the mobile machine. Alternatively, the engine(s) may embody the main or auxiliary power source of a stationary power system 10, such as a pump, if desired.

Power system 10 may be equipped with one or more aftertreatment modules ("modules") 12 having components that cooperate to promote the production of power and to simultaneously control the emission of pollutants from the engine(s) to the atmosphere. In the embodiment of FIG. 1, power system 10 includes a single module 12 mounted to platform 14 that is configured to be generally parallel with a ground surface on which power system 10 is supported. In this embodiment, platform 14 is located gravitationally above any associated engine(s), and ductwork (not shown) may connect module 12 to the engine(s). A mounting bracket (or system of brackets) 16 may be used to connect module 12 to platform 14.

An exemplary mounting arrangement module 12 is shown in FIG. 1. In this arrangement, mounting bracket 16 is configured to engage two primary surfaces of a single module 12 and to hold module 12 at an orientation that avoids interference with other features of power system 10. In particular, mounting bracket 16 may include a bottom support 16a that is configured to connect to a housing bottom or lower-most portion of module 12, and a side support 16b that is configured to connect to housing side or upright portion of module 12. Side support 16b may protrude from bottom support 16a at an oblique angle, such that module 12 is tilted forward (relative to a normal travel direction of power system 10) and away from a bed of power system 10. A clearance may be maintained between module 12 and the bed of power system 10 during operation. Bottom and side supports 16a, 16b may be integrally formed as a single component through a casting or fabrication process. In some embodiment, multiple mounting brackets 16 (e.g., one at each end) may be used to secure module 12 to platform 14.

Figure 2:
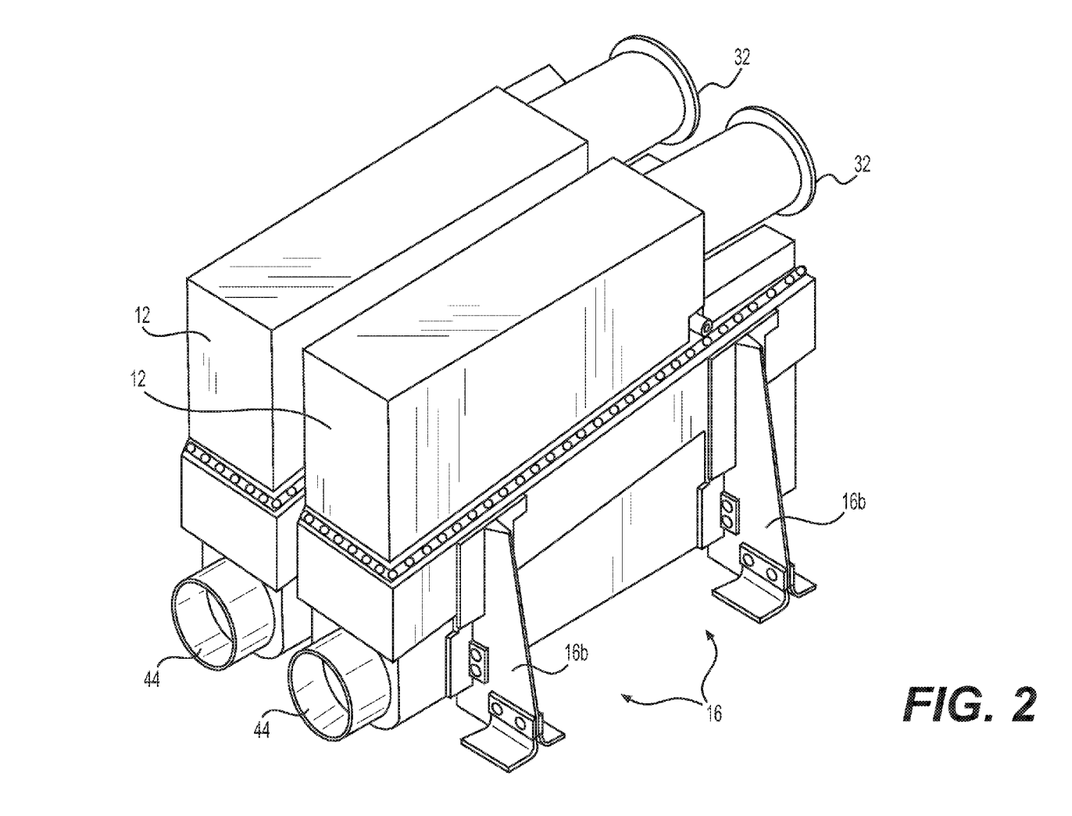
FIG. 2 is an exemplary mounting arrangement of two exemplary disclosed aftertreatment modules that may be used with the power system of FIG. 1.

An alternative mounting arrangement is depicted in FIG. 2. In this arrangement, two modules 12 are shown as being packaged together, to thereby accommodate an engine configuration having increased exhaust flow and/or pollutant concentration. In this arrangement, modules 12 may be stacked together (e.g., side-by-side) and mounted in a vertical orientation at any suitable location onboard power system 10, for example on top of a fuel tank (not shown). Four substantially identical mounting brackets 16 (two on each side of modules 12, with one at each end of the corresponding module 12) having only side supports 16b may be utilized in this embodiment. It is contemplated that any number of modules 12 could be packaged together at any location and/or in any orientation onboard power system 10, as desired.

Figure 3:
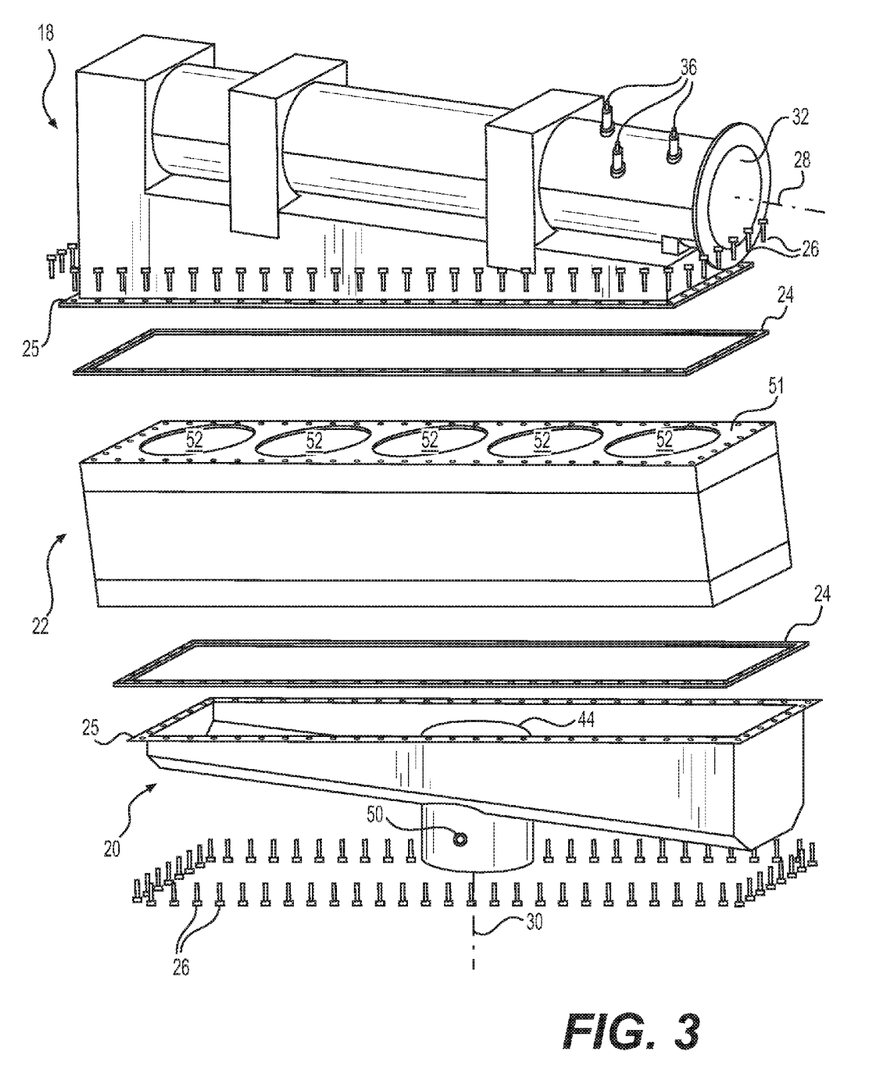
FIG. 3 is an exploded view illustration of another exemplary disclosed aftertreatment module that may be utilized in conjunction with the power system of FIG. 1.

As shown in FIG. 3, each module 12 may be an assembly of components, which are removably connected to each other. For the purposes of this disclosure, the phrase "removably connected" may refer to a means of connection that does require a deformitive or destructive process (e.g., cutting, ripping, grinding, bending, melting, etc.) to reverse.

Module 12 may include, among other things, an inlet housing 18, an outlet housing 20, and a catalyst housing 22 located between inlet and outlet housings 18, 20. One or more seals or gaskets 24 may be located between adjacent housings (e.g., between mounting flanges 25 of adjacent housings), and a plurality of fasteners 26 may be used to removeably connect the housings together.

Figure 4:
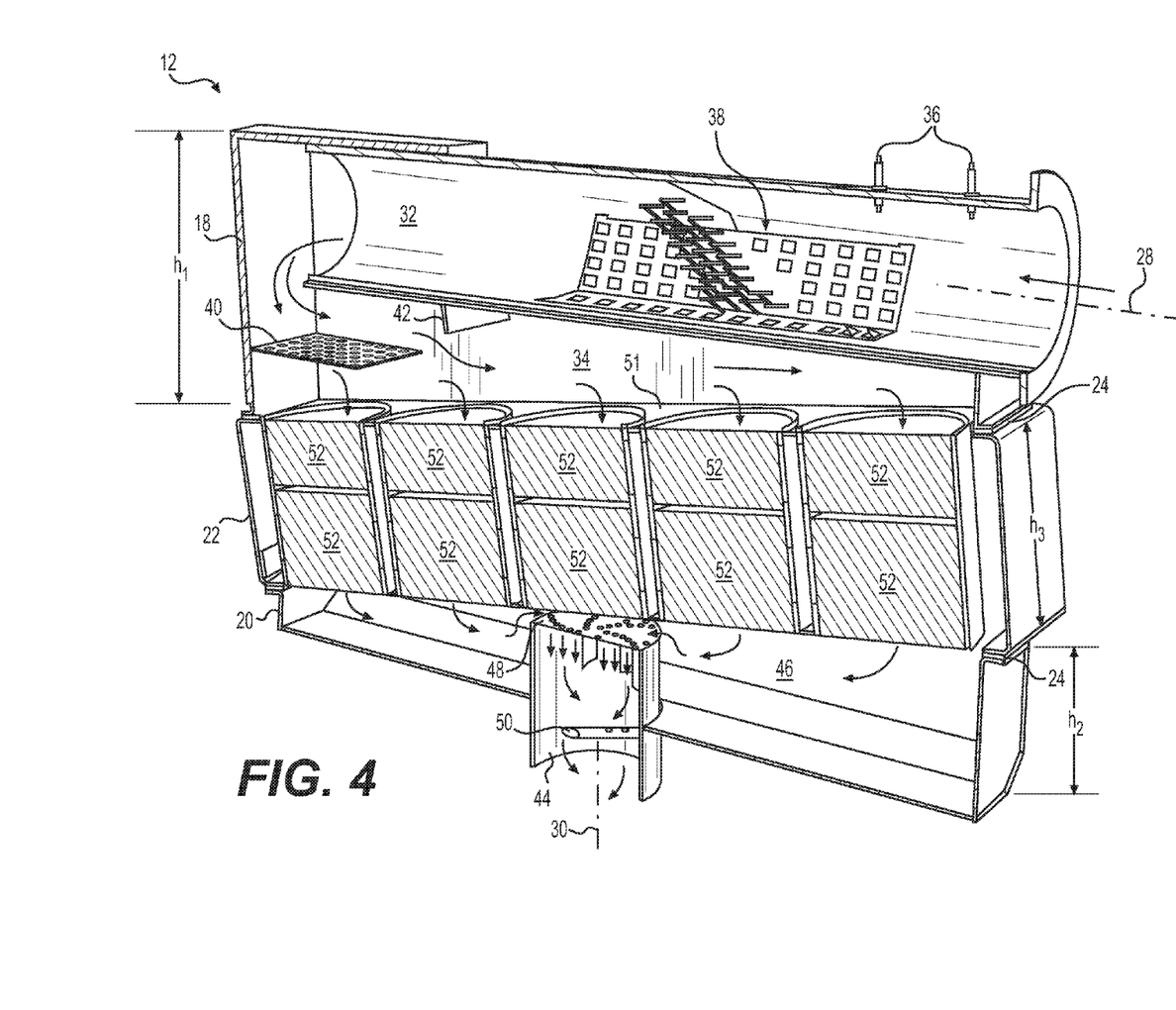
FIG. 4 is a cross-sectional illustration of the aftertreatment module of FIG. 3.

As can be seen in FIGS. 3 and 4, inlet and outlet housings 18, 20 may each have a height $h_1$, $h_2$, respectively, that varies in a length direction, while catalyst housing 22 may have a height $h_3$ that remains substantially constant along its length. In particular, a cross-section (shown in FIG. 4) of inlet and outlet housings 18, 20 may be generally triangular, while a cross-section of catalyst housing 22 may be generally rectangular. The triangular shapes of inlet and outlet housings 18, 20 may be inverted both vertically and horizontally (relative to the perspective of FIGS. 3 and 4), such that an overall cross-section of module 12 may be generally rectangular. With this configuration, mounting flanges 25 may be oriented at an oblique angle relative to axes 28 and 30. Once catalyst housing 22 is assembled between flanges 25, catalyst housing 22 may be inclined relative to the top, bottom, and sides of module 12.

In the embodiment shown in FIGS. 3 and 4, exhaust may flow into module 12 in a first direction and flows out of module 12 in a second direction substantially orthogonal to the first direction. In particular, the entering flow of exhaust may be aligned with an axis 28 that extends through a side of module 12, while the exiting flow of exhaust may be aligned with an axis 30 that extends through a bottom of module 12. It is contemplated, however, that the entering and exiting flows of exhaust could alternatively be aligned in the same or opposing directions (see FIG. 2), if desired, in order to accommodate different engine/power system routing requirements.

Inlet housing 18 may at least partially define an inlet passage 32, and a distribution space 34 located below inlet passage 32 (i.e., located closer to an open bottom of inlet housing 18). Exhaust may enter inlet passage 32 at one side of inlet housing 18, and travel the length of inlet housing 18 to an opposing side. At the opposing side, the flow of exhaust may reverse direction as it enters distribution space 34.

In the disclosed embodiment, inlet passage 32 is a cylindrical conduit having a cross-sectional area that remains substantially constant along its length. One or more reductant injectors 36 (e.g., two to four injectors spaced at various axial and/or annular locations) may be positioned at an entrance to inlet passage 32, and one or more mixers 38 (e.g., three mixers of different types and/or orientations) may be disposed inside inlet passage 32 at locations downstream of injectors 36. Mixers 38 may be configured to evenly mix injected reductant with exhaust as it enters module 12, and to inhibit the reductant from impinging and/or condensing on walls thereof. In the example of FIGS. 3 and 4, injector(s) 36 are located and oriented to spray reductant directly into a portion of the most-upstream mixer 38. It should be noted, however, that other configurations and arrangements of injectors 36 and mixers 38 may be possible.

Distribution space 34 may be designed to distribute exhaust received from inlet passage 32 substantially evenly across the open bottom of inlet housing 18. In particular, distribution space 34 may have a decreasing cross-sectional area along a flow direction. This flow area may decrease at a rate that results in a pressure along a length and width of distribution space 34 remaining about the same. In the disclosed embodiment, a diffuser 40 (e.g., a perforated plate)

may be located at an intersection of inlet passage 32 and distribution space 34 (e.g., at a location where the exhaust flow reverses direction). Diffuser 40 may function to deflect a majority of the exhaust flow toward an opposing end of distribution space 34 where the cross-sectional area becomes smaller. A length and/or porosity of diffuser 40 may be tuned to provide a desired distribution of exhaust for a particular application. In addition, in some applications, a restrictor 42 (e.g., a solid tab) may protrude from inlet passage 32 downward into distribution space 34 at a downstream end of diffuser 40. The location, height, and/or width of restrictor 42 may be adjusted to provide desired exhaust distribution characteristics.

Outlet housing 20 may at least partially define an outlet passage 44 centered along length and width directions, and a collection space 46 located above outlet passage 44 (i.e., located closer to an open top of outlet housing 20). Exhaust may enter collection space 46 along the length of outlet housing 20, and travel inward toward outlet passage 44 at the center of outlet housing 20.

In the disclosed embodiment, outlet passage 44 is a cylindrical conduit having a cross-sectional area that remains substantially constant along its length. A swirl end cap 48 may be positioned at an entrance to outlet passage 44, and one or more sensor flutes 50 may be disposed inside outlet passage 44 at locations downstream of swirl end cap 48. Swirl end cap 48 may be a perforated plate having vanes at an outlet side that are configured to generate swirl in the exhaust as the exhaust exits module 12. Swirl may help to improve a consistency of readings taken by sensors (not shown) mounted within or otherwise connected to flutes 50.

Collection space 46 may be designed to collect exhaust from across the open top of outlet housing 20, while maintaining a substantially constant pressure and flow rate along its length. For this reason, collection space 46 may have a decreasing cross-sectional area along its length. Specifically, at an axial position that generally corresponds with the entrance to distribution space 34 (i.e., where the flows and pressures are greater), the flow area inside collection space 46 may be smallest. And at an axial position that generally corresponds with the terminus of distribution space 34 (i.e., where the flows and pressures are smaller), the flow area inside collection space 46 may be greatest. This flow area profile may encourage even exhaust flow through catalyst housing 22.

Catalyst housing 22 may be a generally four-walled structure having an open top facing inlet housing 18 and an open bottom facing outlet housing 20. A tubular support 51 may be formed inside catalyst housing 22 that is configured to house a plurality of catalyst substrates ("substrates") 52. In particular, support 51 may include multiple tubes (e.g., six) arranged in parallel with each other relative to the flow of exhaust passing through catalyst housing 22, each tube being configured to house one or more (e.g., two) substrates 52 that are arranged in series. Each of substrates 52 may be a Selective Catalytic Reduction (SCR) type of substrate 52, and by arranging multiple substrates 52 within each tube, a distribution of exhaust across end faces of and an effectiveness of substrates 52 may be improved. It should be noted, however, that in other embodiments, the substrates 52 housed within a common tube could alternatively be different types of substrates. For example, the upstream substrate 52 could be a Diesel Oxidation Catalyst (DOC) substrate, while the downstream substrate 52 could be an SCR substrate. Other configurations may also be possible.

As an SCR type of substrate, each substrate 52 may be fabricated from or otherwise coated with a ceramic material such as titanium oxide; a base metal oxide such as vanadium and tungsten; zeolites; and/or a precious metal. With this consist, decomposed reductant entrained within the exhaust flowing through mixers 38 and distribution space 34 may be adsorbed onto the surface and/or absorbed within of each substrate 52. The reductant may then react with NOx (NO and $NO_2$) in the exhaust gas to form water ($H_2O$) and diatomic nitrogen ($N_2$), which may be unregulated substances.

As a DOC type of substrate, each substrate 52 may be fabricated from or otherwise coated with a precious metal such as palladium, platinum, vanadium, or a mixture thereof. With this composition, the substrates 52 may catalyze a chemical reaction to alter the exhaust passing through aftertreatment module 12. For example, substrates 52 may help to convert or otherwise reduce CO, NO, HC, and/or other constituents of the exhaust from the engine(s) into harmless substances such as $CO_2$, $NO_2$, and $H_2O$. In another embodiment, substrates 52 may alternatively or additionally perform particulate trapping functions (i.e., substrates 52 may be catalyzed particulate traps), if desired.

Catalyst housing 22 may tilted in order to accommodate the triangular shapes of inlet and outlet housings 18, 20 (i.e., in order to form the graduated flow areas that promote even exhaust flow through substrates 52). In particular, substrates 52 may each have an upstream end face that lies in a common plane and that is oriented at an oblique angle relative to the flow direction through inlet passage 32 (i.e., relative to axis 28), and a downstream end face that lies within a common plane and that is oriented at an oblique angle relative to a flow direction through outlet passage 44 (i.e., relative to axis 30).

INDUSTRIAL APPLICABILITY

The aftertreatment module of the present disclosure may be applicable to any power system configuration requiring exhaust constituent conditioning, where component packaging and serviceability are important issues. The disclosed aftertreatment module may improve packaging by utilizing multiple small substrates and by efficiently using available onboard space. The disclosed aftertreatment module may improve serviceability by providing for separate replacement of catalyst housing 22. Operation of power system 10 will now be described.

Referring to FIGS. 3 and 4, the exhaust produced by the engine(s) of power system 10 may flow horizontally inward through inlet housing 18 in a first direction via inlet passage 32. As the exhaust flows through inlet passage 32, reductant may be sprayed into the exhaust by injectors 36 and mixed together with the exhaust by mixers 38. When the reductant-laden exhaust reaches the end of inlet passage 32, it may be redirected downward through about 180° to enter distribution space 34. Some of the exhaust may impinge diffuser 40 and some may pass through diffuser 40 to the substrate 52 located immediately below. The exhaust impinging diffuser 40 may deflect away in a second direction generally opposite to the first direction. The exhaust may then flow down the length of distribution space 34 and be pushed downward through the remaining substrates 52 by narrowing of the cross-sectional area of distribution space 34.

As the exhaust flows through substrates 52, the reductant entrained therein may break down in $NH_3$ and be adsorbed and/or absorbed therein. This may facilitate a catalytic reaction within substrates 52 that coverts $NO_x$ in the exhaust to harmless substances. The exhaust may then pass out of substrates 52 into collection space 46, and be redirected inward toward outlet passage 44. The exhaust may pass through swirl end cap 48, wherein the vanes thereof generate swirling of the exhaust to create a substantially homogenous exhaust mixture. Mixing may be beneficial as the exhaust passing through each tube of substrates 52 may have a slightly different composition. In order to obtain a reliable and consistent sensor reading at flutes 50, it may be necessary to mix the different exhaust flows into a more homogeneous flow. The exhaust may then exit outlet passage 44 in a direction substantially orthogonal to the first and second directions.

Catalyst housing 22, along with tubular support 51 and substrates 52, may be configured to be easily replaced (e.g., in the field or in the shop) as a single unit. In particular, after a period of time, the efficiency of substrates 52 may decrease. And in order for power system 10 to remain compliant with government regulations, substrates 52 may need to be replaced. In a conventional aftertreatment module, when this occurs, the entire module is replaced with a completely new module. This can be expensive and labor intensive. However, in the disclosed aftertreatment module, it may be possible to replace only catalyst housing 22.

To replace catalyst housing 22, fasteners 26 may be removed, and inlet and outlet housings 18, 20 separated from catalyst housing 22. A new (or refurbished) catalyst housing 22 may then be placed between flanges 25 of the existing inlet and outlet housings 18, 20, and fasteners 26 reinstalled. In some applications, gaskets 24 may also be replaced at this time. One or more lifting eyes (not shown) may be associated with catalyst housing 22 and connected, for example, to tubular support 51. The lifting eyes may be used to hoist catalyst housing 22 during removal and installation. This service may take little time and have a low cost associated therewith.

Figure 5:
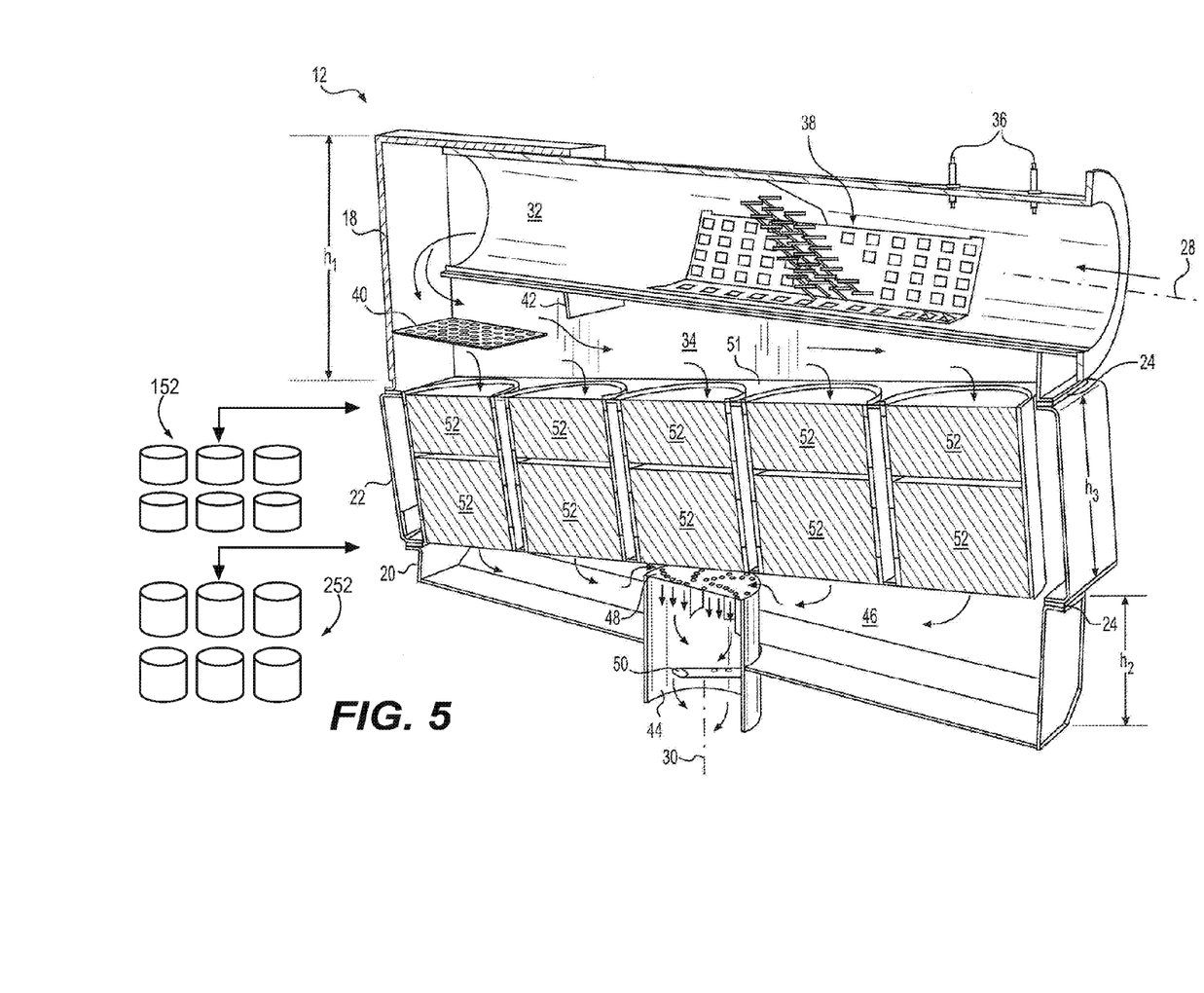
FIG. 5 is a cross-sectional illustration of the aftertreatment module of FIG. 3 in an exemplary embodiment showing additional sets of catalyst substrates.

Referring to FIG. 5, there is shown aftertreatment module 12 as it might appear with a set of catalyst substrates 52 disposed within catalyst housing 22, and two sets of catalyst substrates 152 and 252 that are not disposed within catalyst housing 22. Only one set of catalyst substrates may be disposed inside catalyst housing 22 at a time, and the sets are interchangeable for installation in catalyst housing 22 without requiring a change to catalyst housing 22.

It will be apparent to those skilled in the art that various modifications and variations can be made to the aftertreatment module of the present disclosure without departing from the scope of the disclosure. Other embodiments will be apparent to those skilled in the art from consideration of the specification and practice of the module disclosed herein. It is intended that the specification and examples be considered as exemplary only, with a true scope of the disclosure being indicated by the following claims and their equivalent.

What is claimed is:

1. An aftertreatment module, comprising:
   an inlet housing at least partially defining an inlet passage having a first axis, and a first mounting flange oriented at an oblique angle relative to the first axis, the inlet housing having a height that increases along a direction from an inlet end of the inlet passage to a distal end disposed opposite the inlet end;
   an outlet housing at least partially defining an outlet passage having a second axis, and a second mounting flange oriented at an oblique angle relative to the second axis; and
   a catalyst housing removably connected between the first and second mounting flanges.

2. The aftertreatment module of claim 1, further including:
   a gasket disposed between the catalyst housing and each of the first and second mounting flanges; and
   a plurality of fasteners configured to pass through the gaskets and the first and second mounting flanges and to removably engage the catalyst housing.

3. The aftertreatment module of claim 1, wherein:
   a height of the outlet housing reduces along a length of the outlet housing; and
   a height of the catalyst housing remains the same along a length of the catalyst housing.

4. The aftertreatment module of claim 1, wherein:
   a cross-sectional shape of the inlet housing is triangular;
   a cross-sectional shape of the outlet housing is triangular;
   a cross-sectional shape of the catalyst housing is rectangular; and
   a cross-sectional shape of the aftertreatment module is rectangular.

5. The aftertreatment module of claim 1, wherein the inlet passage has a generally uniform cross-section.

6. The aftertreatment module of claim 1, wherein the inlet passage has a generally circular cross-section.

7. The aftertreatment module of claim 1, wherein the inlet housing is configured to direct an exhaust flow in a first direction and in a second direction opposite the first direction before the exhaust flow enters the catalyst housing.

8. The aftertreatment module of claim 1, wherein
   the catalyst housing includes a plurality of catalyst substrates, and
   at least one of the catalyst substrates is an SCR substrate.

* * * * *